United States Patent [19]

Kimura et al.

[11] Patent Number: 4,920,441
[45] Date of Patent: Apr. 24, 1990

[54] FLEXIBLE MAGNETIC DISKETTE

[75] Inventors: Takashi Kimura, Kawasaki; Kenichi Chihara, Yokohama; Masahiro Tomatsu, Yokohama; Kazunobu Inoue, Yokohama; Norio Yano; Osamu Adachi, both of Yokosuka, all of Japan

[73] Assignees: Nippon Telegraph and Telehpone Corp., Tokyo; Fujitsu Limited, Kawasaki; Fujitsu Kasei Ltd., Yokohama, all of Japan

[21] Appl. No.: 196,866

[22] Filed: May 20, 1988

Related U.S. Application Data

[63] Continuation of Ser. No. 839,035, Mar. 12, 1986, abandoned.

[30] Foreign Application Priority Data

Mar. 13, 1985 [JP] Japan .................................. 60-048165

[51] Int. Cl.$^5$ .......................... G11B 23/02; G11B 5/82
[52] U.S. Cl. .................................... 360/133; 360/99.05
[58] Field of Search ................ 360/133, 97, 99, 97.01, 360/99.04, 99.05, 99.06, 99.08, 99.12; 206/444; 369/282, 290

[56] References Cited

U.S. PATENT DOCUMENTS

| | | | |
|---|---|---|---|
| 4,581,670 | 4/1986 | Nemoto et al. | 360/133 |
| 4,583,144 | 4/1986 | Kato | 360/133 |
| 4,590,532 | 5/1986 | Saito | 360/133 |
| 4,599,663 | 7/1986 | Saito et al. | 360/97 |
| 4,616,278 | 10/1986 | Yamaguchi et al. | 360/133 |
| 4,630,156 | 12/1986 | Saito | 360/133 |

FOREIGN PATENT DOCUMENTS

| | | | |
|---|---|---|---|
| 133541 | 2/1985 | European Pat. Off. | 360/133 |
| 60-20373 | 2/1985 | Japan | 360/133 |

Primary Examiner—John H. Wolff
Attorney, Agent, or Firm—Staas & Halsey

[57] ABSTRACT

A flexible magnetic diskette used for magnetically storing various information which is recorded and read by a magnetic head. The diskette includes a flexible plastic disk sheet uniformly coated with magnetic material and having a mount hole at its center, and a holder for securing the disk sheet over the periphery of the mount hole. The holder is also made of a plastic material for holding the flexible disk sheet over the peripheral portion of the mount hole via a double-sided adhesive ring. A core member is made of a magnetic metal having a high abrasive resistance and rigidly attached to the holder over at least a part of a surface of the holder, with which a drive unit is engaged.

22 Claims, 6 Drawing Sheets

FLEXIBLE MAGNETIC DISKETTE

This is a continuation of copending application Ser. No. 839,035 filed on Mar. 12, 1986 now abandoned.

BACKGROUND OF THE INVENTION

This invention relates to a flexible magnetic diskette for magnetically storing various information which is recorded and read by a magnetic head, and more particularly, to a flexible magnetic diskette having a holder for securing the periphery of a mount hole of the diskette.

Recently, a flexible, magnetic diskette (usually referred to as a floppy disk, which includes a thin flexible disk sheet has become widely used because of its simple and low cost recording and regeneration capability. The flexible magnetic diskette conventionally includes a plastic disk sheet, uniformly coated on both sides with a magnetic material, and a holder for securing the periphery of a mount hole provided in the center of the disk sheet. Generally, such a flexible magnetic diskette is rotatable and is accommodated in a hard case or cartridge, usually referred to as a magnetic disk cartridge, which can be inserted into a disk drive unit for performing function of recording or regeneration.

A holder for securing the periphery of the mount hole of the flexible sheet is conventionally made of a pressed metal sheet or molded plastic material. However, the holders known in the prior art are not satisfactory for rigidly holding the magnetic sheet while maintaining the flexibility and desirable abrasion resistance thereof.

SUMMARY OF THE INVENTION

Accordingly, an object of the present invention is to provide a flexible magnetic diskette provided with a holder for securing the periphery of the mount hole of the flexible sheet, which holder is satisfactory for rigidly holding the magnetic sheet while maintaining the flexibility and desirable abrasion resistance thereof.

According to the present invention, there is provided a flexible magnetic diskette for magnetically storing various information recorded and read by a magnetic head and rotatingly driven by a driving unit. This diskette comprises a plastic disk sheet uniformly coated on both sides with a magnetic material and having a mount hole at the center thereof, and holding means for securing the disk sheet over the periphery of the mount hole. The present invention is characterized in that the holding means comprises a holder body, made of plastic material for holding the flexible disk sheet over the peripheral portion of the mount hole, and a core member. The core member is made of a magnetic metal having a high abrasive resistance, rigidly attached to the holder body over at least one of the surfaces of the holder body. The driving unit is engaged with the core member, so that a center of the core member is aligned with the center of the mount hole.

In the present invention, as the holding means comprises a plastic holder body and a metal core member, the flexible magnetic sheet can be retained in a stable condition and unfavorable deformation or undulation can be effectively prevented from occurring at the peripheral portions around the mount hole of the magnetic sheet. In addition, the plastic holder body does not come into direct, contact with the drive unit; only the core member is in contact with the drive unit. Therefore, this diskette has good endurance properties for long term use.

DESCRIPTION OF THE PREFERRED EMBODIMENTS

Figure 1:
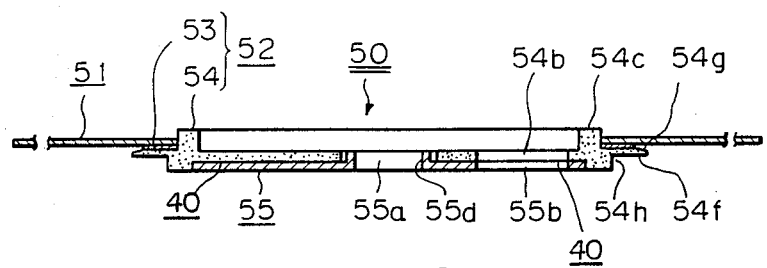
FIG. 1 is a cross-sectional view of a flexible magnetic diskette, according to the present invention.

In the drawings, like reference numerals and marks refer to like parts of throughout.

Figure 2:
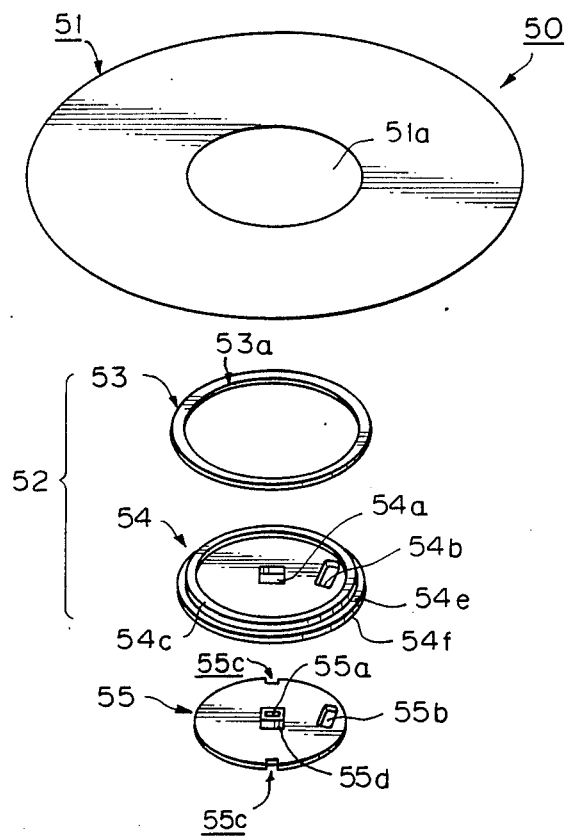
FIG. 2 is an exploded perspective view of the flexible magnetic diskette shown in FIG. 1.

Referring to the drawings, a first embodiment of a flexible magnetic diskette 50 according to the present invention comprises, as shown in FIGS. 1 and 2, a flexible magnetic sheet 51, a holder 52 including a double-sided adhesive ring 53 and a holder body 54, and a flat core member 55 secured to the rotation driven side (bottom face) of the holder 52. The flexible magnetic sheet 51 is formed as a disk having a mount hole 51a at the center thereof. The adhesive ring 53 is made of a plastic film or sheet, and an adhesive material is coated on both sides thereof. The adhesive ring 53 is formed with an opening 53a having, an inner diameter substantially the same as that of the inner diameter of the mount hole 51a of the flexible magnetic sheet 51.

The body 54 of the holder 52 is formed, by molding, as a disk plate of a plastic material having substantially the same or similar coefficient of thermal expansion as that of the flexible magnetic sheet 51. The body 54 is provided with a rectangular shaft insert hole 54a at the center thereof and a drive pin insert hole 54b in the vicinity of the hole 54a, and an upright cylindrical projection 54c having an outer periphery capable of fitting into the mount hole 51a of the flexible magnetic sheet 51. The body 54 is also provided with an outer flange 54f having a flat ring-shaped supporting face 54e arranged at the outer periphery of the cylindrical projection 54c via a step. The supporting surface 54e is provided at the outer periphery thereof with an inclined face 54g (see FIG. 1). On the other hand, the body 54 is provided at its bottom with a cylindrical projection 54h (see FIG. 1) connected to the flange 54f via a step.

The body 54 of the holder 52 is advantageously made of a material such as a polycarbonate including an additive of between 5 to 35 weight%, most preferably about 20 weight% of carbon milled fibers.

The core member 55 is a substantially flat disk made of a magnetic metal such as ferrite stainless steel, for example, SUS 430 (ISO), having a coefficient of thermal expansion of $10.3 \times 10^{-6}/°$ C. and having a good abrasion resistance. The core member 55 is provided with a shaft insert hole 55a at the center thereof, and in the vicinity thereof, with a drive pin insert hole 55b capable of aligning with the drive pin insert hole 54b of the holder body 54, a pair of diametrically opposed notches 55c at the outer periphery thereof for preventing free rotation thereof, and a neck portion 55d projected upward at the outer periphery thereof formed by, for example, burring The flexible magnetic diskette 50 shown in FIG. 1 can be assembled as follows First, the core member 55 is rigidly attached to the holder body 54. In this process, it is advantageous that the core member 55 be integrally molded with the holder body 54 when the latter is formed by molding. However, it is also advantageous that the holder body 54, having at its lower face a recess 40 for accommodating the core member 55, is formed independently with respect to the latter, as seen in FIG. 2. The core member 55 is then rigidly fitted to the recess 40 of the holder body 54. In this case, the neck portion 55d of the core member 55 is a little smaller than the shaft insert hole 54a of the holder body 54, to facilitate the insertion of the core member 55, and is positioned with respect to the holder body 54 by the outer periphery of the core member 55 and the insert recess 40 of the holder body 54, so that the drive pin insert holes 54b and 55b are aligned with each other. Then, the double-sided adhesive ring sheet 53 is fitted to the outer periphery of the cylindrical projection 54c and adhered to the supporting face 54e of the holder body 54. The magnetic sheet 51 is then inserted in the holder body 54 by fitting the mount hole 51a of the former to the outer periphery of the cylindrical projection 54c of the holder body 54. The magnetic sheet 51 is thus rigidly adhered by the inner edge of the mount hole 51a to the adhesive ring sheet 53.

Thus, in the first embodiment as mentioned above, the holder 52 comprising the adhesive ring 53 and the holder body 54 serves to hold the magnetic sheet 51, and the core member 55 has the insert hole 55a in which the rotation drive shaft (not shown in FIGS. 1 and 2) is directly engaged.

Figure 3:
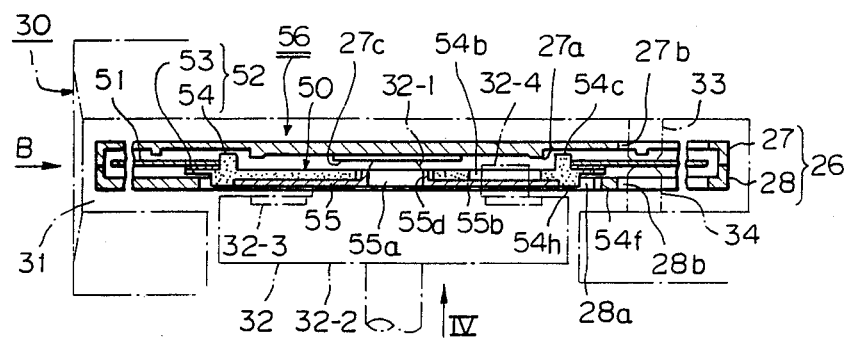
FIG. 3 is a cross-sectional view of a disk cartridge comprising a flexible magnetic diskette inserted in a cartridge, in which a disk drive unit is illustrated by a dotted line.
Figure 4:
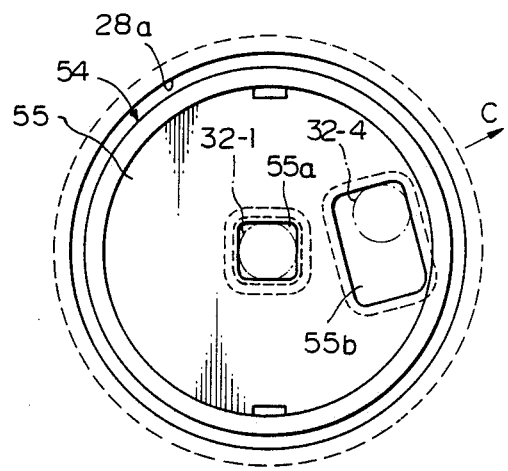
FIG. 4 is a view of the cartridge seen from a point IV in FIG. 3.

In FIGS. 3 and 4, a magnetic disk cartridge 56 comprises a diskette 50, as mentioned above, and a hard case 26 for accommodating the diskette 50. The hard case 26 comprises upper and lower case halves 27 and 28 abutted together along the peripheral edges thereof. The upper case half 27 is provided on its inner wall with a center plate 27c and a cylindrical wall 27a therearound. The outer diameter of the cylindrical wall 27a is a little smaller than the inner diameter of the cylindrical projection 54c of the holder body 54, to allow the diskette 50 some freedom in the radial direction. The lower case half 28 is provided at its center with a circular opening 28a, which is a little larger than the outer diameter of the cylindrical projection 54h of the holder body 54, also to give the diskette 50 freedom in the radial direction. Therefore, the diskette 50 is rotatably accommodated in the case 26 with some freedom in the radial direction. The upper and lower case halves 27 and 28 have corresponding head insert holes 27b and 28b. A disk drive unit 30, generally shown by a dotted line, is provided with a cartridge insert slot 31, a chuck 32 at the inside of the cartridge insert slot 31, and a pair of upper and lower magnetic heads 33 and 34. The chuck 32 generally comprises a center shaft 32-1, a rotary table 32-2 rigidly mounted on the center shaft 32-1, a ring-shaped magnet 32-3 mounted on the upper periphery of the rotary table 32-2, and a drive pin 32-4 mounted on the rotary table 32-2 so as to be capable of protruding upward therefrom.

The cartridge 56 is inserted into the insert slot 31, as shown by an arrow B, and the case 26 is then placed in a predetermined position. Then, the rotary center shaft 32-1 and the drive pin 32-4 are automatically advanced to engage with the shaft insert hole 55a and the pin insert hole 55b of the core 55, respectively. On the other hand, the upper and lower magnetic heads 33 and 34 are given access to the magnetic sheet 51 to conduct a read or write (record) operation, as necessary. During these operations, the bottom of the core 55 is attracted to the support table 32-2 by means of the ring-shaped magnet 32-3 and also urged radially outward, as shown by an arrow C in FIG. 4, by the drive pin 32-4, so that the adjacent two sides of the insert hole 55b engage with the rotary shaft 32-1 and, therefore, the flexible sheet 51 is located in its prescribed position. Thus, the magnetic diskette 50 can be rotated by the drive pin 32-4.

To ensure a contact as perfect as possible between the flexible magnetic sheet 51 and the upper and lower magnetic heads 33 and 34, it is advantageous that the lower magnetic head 34 be located slightly above the ideal contact surface of rotation by a small distance, for example, a few 100 micron, and on the other hand, the upper magnetic head 33 be urged downward with a small spring force, such as 20 g, for a 3.5 inch diskette.

Figure 5:
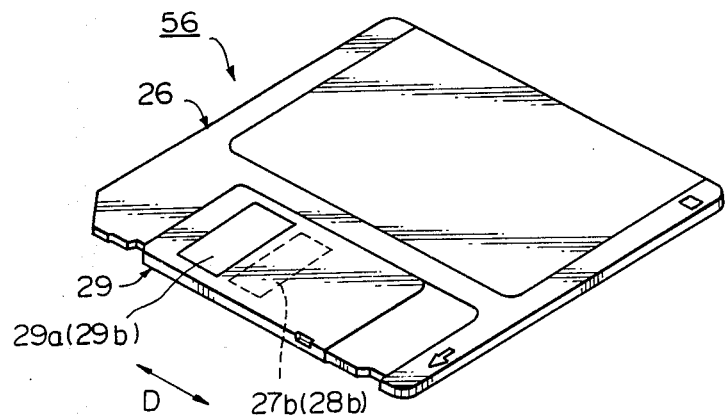
FIG. 5 is a perspective view of the magnetic disk cartridge as shown in FIG. 3.
Figure 6:
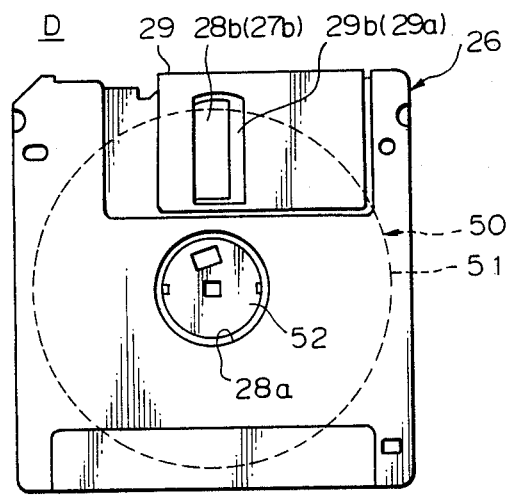
FIG. 6 is a bottom plan view of the magnetic disk cartridge as shown in FIG. 3.

FIGS. 5 and 6 show the outer appearance of the magnetic disc cartridge 56, in which a shutter 29 is made of thin plate material and formed in a U-shaped cross-section, and is provided with a pair of upper and lower windows 29a and 29b. The shutter 29 is slidingly mounted on the case 26, and slides the direction as shown by an arrow D. The head insert hole 27b (28b) is closed by the shuttle 29, which is urged by a spring means (not shown) when the cartridge 56 is not inserted and, on the other hand, is automatically opened, as shown in FIG. 6, by the drive unit 30 (FIG. 3) when the cartridge 56 is inserted.

Figure 7:
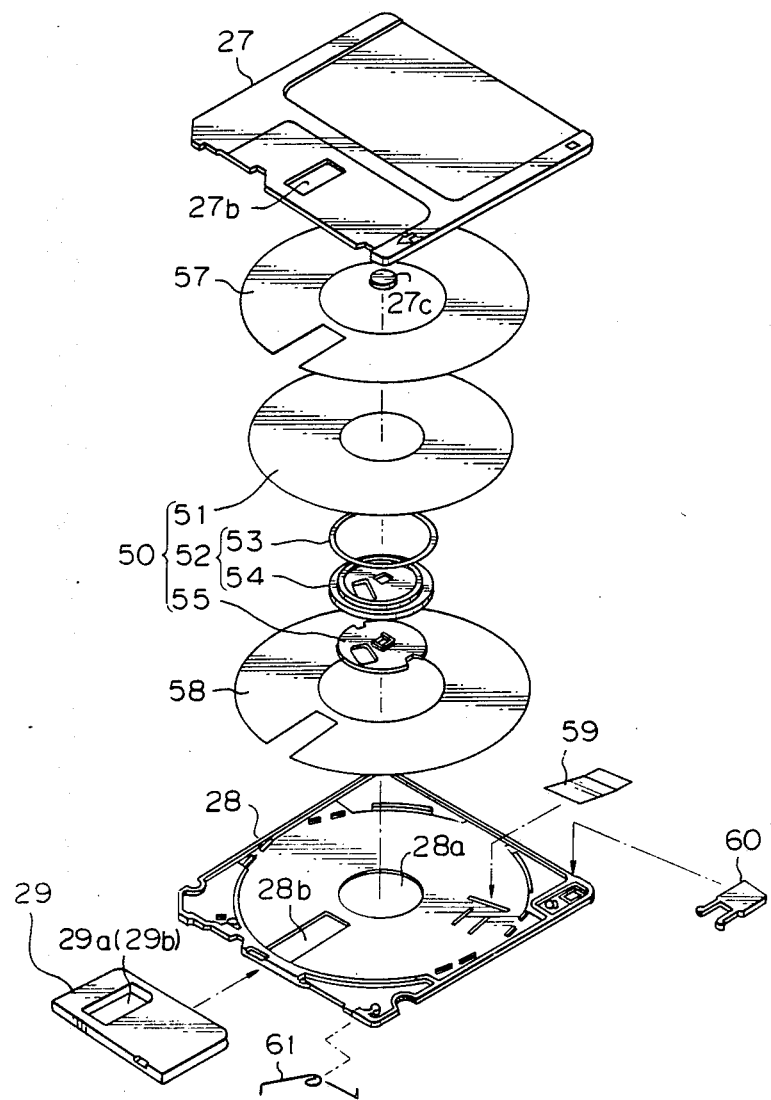
FIG. 7 is an exploded perspective view of the magnetic disk cartridge as shown in FIG. 3.

FIG. 7 illustrates an exploded perspective view of the magnetic disc cartridge 56, in which reference numerals 57 and 58 denote upper and lower sheets made of a non-fabric material. At least a part of each sheet is adhered to the upper or lower case half 27 or 28 and another part thereof is in contact with the front or back surface of the magnetic sheet 51, to remove any dust attached to the disk surfaces and to compensate for any possible nonuniformity of the rotation surfaces of the magnetic sheet 51 during rotation thereof. Reference numeral 59 denotes a leaf spring having one end mounted on the lower case half 28 and the other end in resilient contact with and exerting a slight force on the non-fabric sheet 58, to push it toward the magnetic sheet 51; 60 denotes a protecting means for preventing unintentional recording; and 61 denotes a spring means constantly urging the shutter 29 in a predetermined direction.

Figure 8:
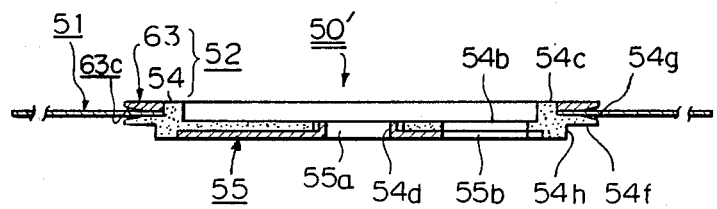
FIG. 8 a cross-sectional view of another embodiment flexible magnetic diskette according to the present invention.
Figure 9:
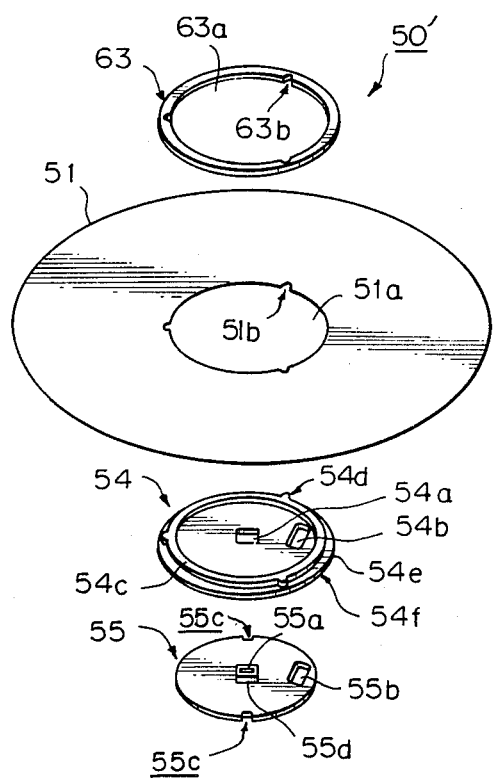
FIG. 9 is an exploded perspective view of the flexible diskette shown in FIG. 8.

FIGS. 8 and 9 illustrate a second embodiment of a flexible magnetic diskette according to the present invention. Only the construction and operations thereof which are different from those of the first embodiment will be described. The diskette 50' includes a holding ring plate 63 in place of the double-sided adhesive ring 53 (FIGS. 1 and 2).

The flexible magnetic sheet 51 is provided with a mount hole 51a, as well as several (in this case, three) notches 51b equidistantly set around the peripheral edge of the mount hole 51a for restricting the disc in the direction of rotation thereof. The holding ring plate 63 is made of a flat metal plate having a coefficient of thermal expansion substantially the same or similar to that of the flexible magnetic sheet 51 and formed with an opening 63a having an inner diameter substantially the same as the inner diameter of the mount hole 51a of the flexible magnetic sheet 51. The ring 63 is also provided with several notches 63b corresponding to the above-mentioned notches 51b of the flexible magnetic sheet 51 and an inclined face 63c along the bottom outer peripheral edge thereof. The holding ring 63 also can be made of any suitable plastic material. The holder body 54 is provided, on the outer side wall of the cylindrical projection 54c, with several projections 54d capable of engaging with the notches 51b of the magnetic sheet 51.

The flexible magnetic diskette 50' shown in FIG. 8 can be assembled as follows. First, the core member 55 is rigidly attached to the holder body 54, in the same manner as in the first embodiment described above. Then, the magnetic sheet 51 is inserted into the holder body 54 by fitting the mount hole 51a of the former to the outer periphery of the cylindrical projection 54c of the holder body 54 and also engaging the dent portions 51b with the projections 54d. The magnetic sheet 51 is supported by the inner edge of the mount hole 51a on the ring supporting surface 54e of the holder body 54 and restricted in the circumferential direction by the projections 54d. The ring plate 63 is then inserted into the body 54 through the magnetic sheet 51 by fitting the hole 63a of the ring plate 63 onto the cylindrical projected portion 54c of the holder body 54 and engaging the dent portions 63b with the projections 54d. Then, the upper end of the cylindrical projected portion 54c of the body 54 is pressed and heat-deformed so as to rigidly secure the ring plate 53 to the body 54. Thus, in this second embodiment as mentioned above, the holder 52 comprising the pushing ring plate 63 and the holder body 54 serves to nippingly hold the magnetic sheet 51.

Figure 10:
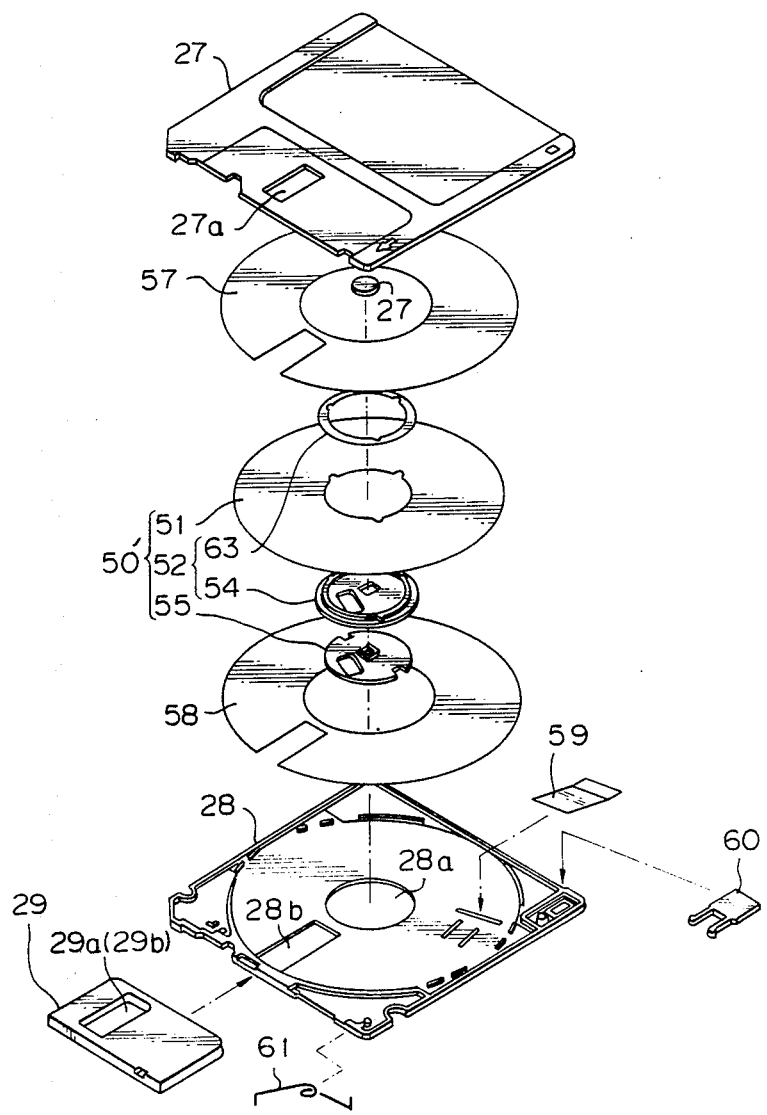
FIG. 10 an exploded perspective view of a disk cartridge including the diskette shown in FIG. 8.

In FIG. 10, the magnetic disk cartridge 56 is illustrated in an exploded perspective view which is similar to FIG. 7 but which shows the magnetic diskette 50' of the second embodiment including the non-adhesive holding ring plate 63.

We claim:

1. A flexible magnetic diskette for magnetically storing various information recorded and read by a magnetic head and engagable with and rotationally driven by a driving unit, said diskette comprising:
   a plastic disk sheet having two sides which are uniformly coated with magnetic material and having a mount hole at a center thereof and including a periphery; and
   holding means, mounted at the periphery of said mount hole, for securing said plastic disk sheet, said holding means comprising:
   a holder body, made of plastic and held to said flexible disk sheet at the periphery of said mount hole;
   a double-sided adhesive ring between said holder body and one side of said plastic disk sheet, adhesively securely said plastic disk sheet to said holder body; and
   a core member, made of magnetic metal having a high abrasive resistance, rigidly attached to said holder body and spaced from said plastic disk sheet, a center of the core member aligning with the center of said plastic disk sheet,
   wherein said holder body and said core member each have corresponding shaft insert holes passing therebetween through which the center shaft is inserted, and the disk sheet is thus positioned relative to the magnetic head.

2. A flexible magnetic diskette as set forth in claim 1, wherein said holder body and said core member each have corresponding drive pin insert holes passing therethrough adjacent to said shaft insert holes.

3. A flexible magnetic diskette for magnetically storing various information recorded and read by a magnetic head and engagable with and rotationally driven by a driving unit, said diskette comprising:
   a plastic disk sheet having two sides which are uniformly coated with magnetic material and having a mount hole at a center thereof and including a periphery; and
   holding means, mounted at the periphery of said mount hole, for securing said plastic disk sheet, said holding means comprising:
   a holder body, made of plastic comprising polycarbonate containing an additive of 5 to 35 weight% of carbon milled fibers held to said flexible disk sheet at the periphery of said mount hole; whereby said polycarbonate containing an additive of 5 to 35 weight% of carbon milled fibers improves the fluidity of the plastic when the plastic is heated to facilitate molding of the plastic; and
   a core member, made of magnetic metal having a high abrasive resistance, rigidly attached to said holder body and spaced from said plastic disk sheet, a center of the core member aligning with the center of said plastic disk sheet.

4. A flexible magnetic diskette for magnetically storing various information recorded and read by a magnetic head and rotationally driven by a driving unit, said diskette comprising:
   a plastic disk sheet uniformly coated on both sides with magnetic material and having a mount hole at a center thereof and including a periphery; and
   holding means, mounted at the periphery of said mount hole, for securing said plastic disk sheet, said holding means comprising:
   a substantially disk-shaped holder body having surfaces and including an outer periphery, made of plastic material and held to said flexible disk sheet at the periphery of said mount hole;
   a core member, made of magnetic metal having high abrasive resistance, rigidly attached to said holder body on at least one of the surfaces of said holder body and spaced from said plastic disk sheet by said holder body, a center of said core member aligning with the center of said plastic disk sheet;
   a ring-shaped flat-flanged support surface on the outer periphery of said holder body at the opposite side of said holder body from said core member; and
   a double-sided adhesive ring between said support surface on one side of said plastic disk sheet for attaching said support surface to said plastic disk sheet, wherein said holder body and said core member each have corresponding shaft insert holes passing therethrough through which the center shaft is inserted, and the disk sheet is thus positioned relative to the magnetic head.

5. A flexible magnetic diskette as set forth in claim 4, wherein said holder body further comprises a cylindrical projection having an outer wall thereof engaging with the mount hole of said plastic disk sheet at the opposite side of said holder body from said core member.

6. A flexible magnetic diskette as set forth in claim 4, wherein said ring-shaped flat-flanged support surface is tapered at an outer edge thereof, separating it from said plastic disk sheet.

7. The diskette as recited in claim 4, wherein the core member has a drive pin insert hole in the vicinity of said shaft insert hole and a drive pin of the drive unit is inserted into said pin insert hole.

8. A flexible magnetic diskette for magnetically storing various information recorded and read by a magnetic head and engaging with and rotationally driven by a driving unit, said diskette comprising:
 a plastic disk sheet having two sides which are uniformly coated with magnetic material and having a mount hole at a center thereof and including a periphery; and
 holding means, mounted at the periphery of said mount hole, for securing said disk sheet said holding means comprising:
  a substantially disk-shaped holder body having surfaces and an outer periphery, made of plastic and held to said flexible disk sheet at the periphery of said mount hole;
  a core member, made of magnetic metal having high abrasive resistance, rigidly attached to said holder body on at least one of the surfaces of said holder body and spaced from said plastic disk sheet by said holder body, a center of the core member aligning with the center of said plastic sheet;
  a ring-shaped flat-flanged support surface on the outer periphery of said holder body;
  a cylindrical projection on said holder body having an outer wall thereof engaging with said mount hole of said plastic disk sheet; and
  a ring plate fitted to said cylindrical projection of said holder body and fixed to said holder body to nippingly hold said plastic disk sheet at the peripheral portion of said mount hole thereof.

9. A flexible magnetic diskette as set forth in claim 8, wherein:
 said outer wall is provided with projections equidistantly arranged thereon;
 said plastic disc sheet has notches equidistantly arranged along the edge of said mount hole; and
 said ring plate has an inner wall having notches equidistantly arranged therealong engaging with said projections of said holder body.

10. A flexible diskette for magnetically storing data, engagable with and rotationally driven by a driving unit which includes a ring shaped magnet, comprising:
 a flexible disk sheet uniformly coated with magnetic material and having a mount hole at a center thereof; and
 holding means for securing said disk sheet and comprising:
  a rigid holder body attached to said flexible disk sheet; and
  a core member, attached to said holder body and spaced from said flexible disk sheet by said holder body, said holding means rigidly clamping said flexible disk sheet at said mount hole, said ring shaped magnet magnetically attracting said core member when said diskette engages said driving unit, holding the diskette against the driving unit and allowing said disk sheet flexibility of movement,
 wherein said holder body and said core member each have corresponding shaft insert holes passing therethrough through which the center shaft is inserted, and the disk sheet is thus positioned relative to the magnetic head.

11. A flexible magnetic diskette as set forth in claim 10, wherein said shaft insert hole of said holder body has an inner wall, said core member includes a central portion and said shaft insert hole of said core member is formed by bending the central portion thereof by burring, so that the bent central portion of said core member is arranged adjacent to the inner wall of said shaft insert hole of said holder body.

12. A flexible magnetic diskette as set forth in claim 10, wherein said metal core member is integral with said plastic holder body.

13. A flexible magnetic diskette as set forth in claim 10, wherein said core member is made of ferrite stainless steel.

14. A flexible diskette according to claim 10, wherein said holder body comprises plastic.

15. A flexible diskette according to claim 14, wherein said core member comprises magnetic metal having a high abrasive resistance.

16. The diskette as recited in claim 10, wherein the core member has a drive pin insert hole in the vicinity of said shaft insert hole and a drive pin of the drive unit is inserted into said pin inset hole.

17. The diskette as recited in claim 10, wherein both said shaft insert hole and pin insert hole are rectangular.

18. A flexible magnetic diskette for magnetically storing various information recorded and read by a magnetic head and engagable with and rotationally driven by a driving unit, said diskette comprising:
 a plastic disk sheet having two sides which are uniformly coated with magnetic material and having a mount hole at a center thereof and including a periphery; and
 holding means, mounted at the periphery of said mount hole, for securing said plastic disk sheet, said holding means comprising:
  a holder body, made of plastic and held to said flexible disk sheet at the periphery of said mount hole, said holder body including;
  a step portion comprising a flat-flanged support surface attached to the plastic disk sheet around said mount hole thereof via a double-sided adhesive ring between the support surface and the plastic disk; and
  a projection having an outer wall engaging with said mount hole of the plastic disk sheet; and
  a core member, made of magnetic metal having a high abrasive resistance, rigidly attached to said holder body on one of the surface of the holder body, said surface being opposite to said flat-flanged support surface, a center of the core member aligning with the center of said plastic disk sheet, wherein said holder body and said core member each have corresponding shaft insert holes passing therethrough through which the center shaft is inserted, and the disk sheet is thus positioned relative to the magnetic head.

19. The diskette as recited in claim 18, wherein the core member has a drive pin insert hole in the vicinity of said shaft insert hole and a drive pin of the drive unit is inserted into said pin insert hole.

20. A flexible magnetic diskette for magnetically storing various information recorded and read by a magnetic head and rotationally driven by a driving unit, said diskette comprising:

a plastic disk sheet uniformly coated on both sides with magnetic material and having a mount hole at a center thereof and including a periphery; and holding means, mounted at the periphery of said mount hole, for securing said disk sheet, said holding means comprising:

a substantially disk-shaped holder body having surfaces and including an outer periphery, made of plastic material and held to said flexible disk sheet at the periphery of said mount hole, said holder body having a step portion comprising a flat-flanged support surface engaging with the plastic disk sheet around said mount hole thereof and a projection having an outer wall engaging with said mount hole of the plastic disk sheet;

a core member, made of magnetic metal having high abrasive resistance, rigidly attached to said holder body on one of the surfaces of said holder body, said surface being opposite to said flat-flanged support surface, a center of said core member aligning with the center of said plastic sheet; and a double-sided adhesive ring between said flat-flanged support surface and said plastic disk sheet for attaching said flat-flanged support surface to one of the surfaces of said plastic disk sheet at the periphery of said mount hole, wherein said holder body and said core member each have corresponding shaft insert holes passing therethrough through which the center shaft is inserted, and the disk sheet is thus positioned relative to the magnetic head.

21. The diskette as recited in claim 20, wherein the core member has a drive pin insert hole in the vicinity of said shaft insert hole and a drive pin of the drive unit is inserted into said pin insert hole.

22. A flexible magnetic diskette for magnetically storing various information recorded and read by a magnetic head and engaging with and rotationally driven by a driving unit, said diskette comprising:

a plastic disk sheet having two sides which are uniformly coated with magnetic material and having a mount hole at a center thereof and including a periphery; and holding means, mounted at the periphery of said mount hole, for securing said disk sheet, said holding means comprising:

a substantially disk-shaped holder body having surfaces and an outer periphery, made of plastic and held to said flexible disk sheet at the periphery of said mount hole, said holder body having a step portion comprising a flat-flanged support surface engaging with the plastic disc sheet around said mount hole thereof and a projection having an outer wall engaging with said mount hole of the plastic disk sheet;

a core member, made of magnetic metal having high abrasive resistance, rigidly attached to said holder body on at least one of the surfaces of said holder body, said surface being opposite to said flat-flanged support surface, a center of the core member aligning with the center of said plastic sheet;

a cylindrical projection on said holder body having an outer wall thereof engaging with said mount hole of said plastic disk sheet; and a ring plate fitted to said cylindrical projection of said holder body and fixed to said holder body to nippingly hold said plastic disk sheet at the peripheral portion of said mount hole thereof.

* * * * *

UNITED STATES PATENT AND TRADEMARK OFFICE
CERTIFICATE OF CORRECTION

PATENT NO. : 4,920,441
DATED : April 24, 1990
INVENTOR(S) : Takashi Kimura et al.

It is certified that error appears in the above-identified patent and that said Letters Patent is hereby corrected as shown below:

On the title page:

The following patents should be listed:

U.S. Patent:

| Document No. | Date | Name | Class/Subclass |
|---|---|---|---|
| 4,149,207 | 4/10/79 | Porter, Jr. et al. | 360/133 |

Foreign Patents:

| Document No. | Date | Country |
|---|---|---|
| 2,127,206 | 4/4/84 | Great Britain |
| 2,102,188 | 1/26/83 | Great Britain |
| 0,133,541 | 2/27/85 | EPA |
| 2,488,714 | 2/19/82 | France |
| 2,108,309 | 5/11/83 | Great Britain |

UNITED STATES PATENT AND TRADEMARK OFFICE
CERTIFICATE OF CORRECTION

PATENT NO. : 4,920,441
DATED : April 24, 1990
INVENTOR(S) : Takashi Kimura et al.

It is certified that error appears in the above-identified patent and that said Letters Patent is hereby corrected as shown below:

Col. 1, line 26, before "function" insert --the--;
line 67, "direct," should be --direct--.

Col. 2, line 22, before "flexible" insert --of a--;
line 26, before "an" insert --is--;
line 32, delete "of".

Col. 4, line 39, after "slides" insert --in--.

Col. 5, line 67, "securely" should be --securing--.

Signed and Sealed this

Sixteenth Day of July, 1991

Attest:

HARRY F. MANBECK, JR.

*Attesting Officer*    *Commissioner of Patents and Trademarks*